Sept. 12, 1933.  E. C. HATCHER  1,926,483
AUTOMATIC CLUTCH DEVICE
Filed Oct. 29, 1931
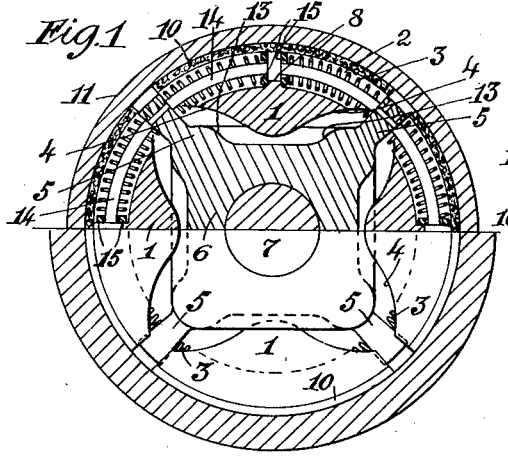
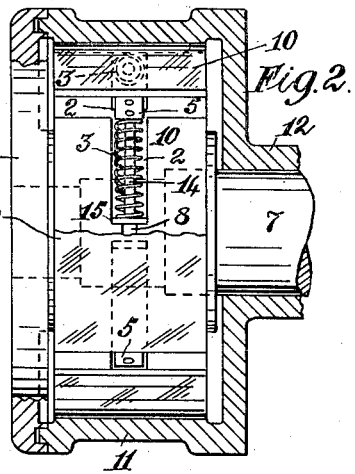
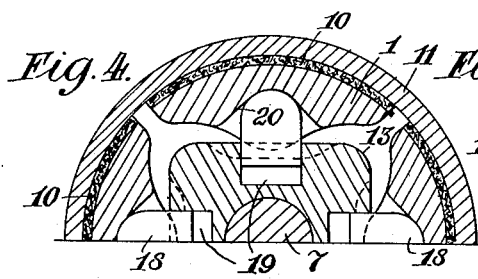
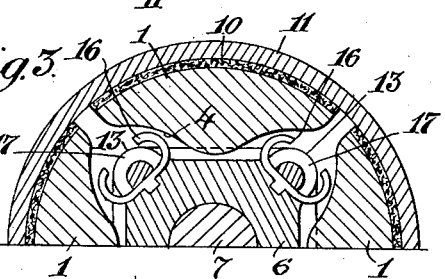
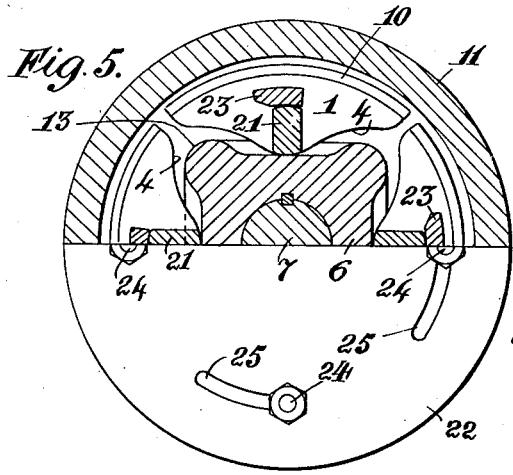
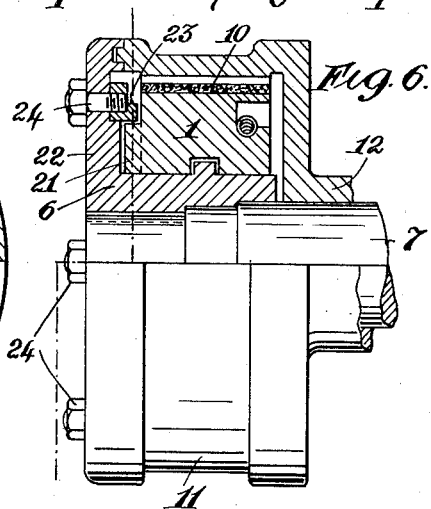
Inventor
Ernest C. Hatcher.
By Sommers & Young
Atty Patented Sept. 12, 1933

1,926,483

UNITED STATES PATENT OFFICE 1,926,483

AUTOMATIC CLUTCH DEVICE

Ernest Charles Hatcher, Northwood, England, assignor to J. Stone & Company Limited, Deptford, England, a company of Great Britain.

Application October 29, 1931, Serial No. 571,850, and in Great Britain November 20, 1930

8 Claims. (Cl. 192—105)

This invention concerns improvements in and relating to centrifugal clutch devices for use in transmission gearing particularly such gearing as employed in association with the running axles of vehicles. The invention relates to improvements in centrifugal clutch devices of the kind wherein the centrifugal clutch members are subjected to a camming or wedging action by the driving member when they grip the driven member, the object being to obtain a driving grip which is greater and prompter in action than that obtained by centrifugal effects alone. Such a clutch and a mode of use thereof are described, for instance, in applicant's Patent No. 1,857,020, dated May 3, 1932.

For some types of drive, for example, in the driving of certain auxiliary apparatus from the axles of vehicles it is undesirable that a sharp jerk should be given to the driven portion of the transmission gearing at the moment when the wedging or camming action reinforces the centrifugal clutching effect. An object of the present invention is to obviate the possibility of such a jerk without sacrificing any of the substantial advantages of the type of centrifugal clutch referred to. According to the present invention, therefore, provision is made for a comparatively gentle transition or gradual change from the initial clutching stage in which centrifugal action alone is involved and the final clutching condition in which the centrifugal action is assisted by wedging or camming action. To this end use is made of means for resiliently resisting the camming or wedging movement. With the arrangement described in the above numbered patent, the wedging or camming action is brought about by slight circumferential movement or retardation of the clutch shoes when they come into contact with the driven member. For the purposes of the present invention this movement may be resisted by spring means, a counteracting centrifugal effect or the like, the amount and nature of the resistance being designed to afford the desired give or resilience at the moment when the clutch automatically engages.

Reference will now be made to various embodiments of the invention illustrated by way of example in the accompanying drawing and intended more particularly for use in conjunction with clutches constructed and employed in the manner described in the patent above referred to. In said drawing:

Figures 1 and 2 are a cross-section and axial section respectively of one embodiment, Figures 3 and 4 cross-sections of alternative embodiments.

Figures 5 and 6 part sectional end and side elevations of a modified arrangement.

In the arrangement shown in Figures 1 and 2, each shallow clutch shoe 1 is provided with a circumferential slot 2 for the accommodation of a compression spring 3 which, when at its normal extension, projects beyond the cam portions 4 of the shoe into contact with stops 5 which are carried by the driving member 6 fast on the driving shaft 7. Each spring 3 is anchored centrally of its length or (as shown) is divided into two parts separated by a stop 8 formed on the shoe 1 in the slot 2. Said spring-parts 3 are covered, in the slot 2, by the clutch-shoe facing or pad 10 which is made of friction material for gripping against the inner face of the drum 11 on the driven shaft 12. Below the cut-in speed of the clutch, the spring parts 3 tend to keep the clutch shoe 1 in a position in which its cam surface 4 is not engaged by the complementary camming or wedging surfaces 13 on the driving member 6. With a reversible clutch, the shoe 1 is maintained midway between the camming or wedging surfaces 13 provided on said driving member 6 for the two directions of rotation. On the cut-in speed being attained the centrifugal force acting on the shoe 1 will have brought the shoe-facing 10 into contact with the driven member 11 which, tending to retard the shoe, will cause the trailing spring-part 3 to be compressed between the following stop 5 on the driving member 6 and the stop 8 on the shoe 1. The spring is not made sufficiently strong to prevent the co-operating cam surfaces 4, 13 on the shoe 1 and driving member 6 from entering into engagement to assist the centrifugal action but is merely made so strong as to prevent said engagement producing a sudden jerk in the driven parts or apparatus. If desired, the spring-parts 3 may be disposed (as shown) around rods 14 mounted between the stops 5 and washers 15 abutting against the stop 8, said rods being fast in the stops 5 but free to slide through the washers 15 into a slot in the stop 8. In any case the arrangement must not be such as to interfere with the proper action of any normal spring loading (not shown) provided to resist the outward movement of the centrifugal elements of the clutch. It will be appreciated that the springs 3 will themselves facilitate disengagement of the shoe from the driven member.

Alternatively the driving member 6 may be provided with buffer devices whose resistance must be overcome before full wedging engagement between the shoes 1 and said driving member takes place. Such buffer-devices may, as illustrated in Figure 3, take the form of C-shaped springs 16 secured in transverse slots 17 in the cam elevations 13 on the driving member 6. The C-shaped springs 16 are designed so that their limbs, normally extending outside said slots 17, are adapted to be forced thereinto by the movement of the clutch shoes 1 when retarded by the driven member 11. Instead of being accommodated in the slots 17, the springs 16 might be mounted at one or both ends of the driving member 6.

In another modification the resistance to the circumferential movement of the shoe 1 into wedging engagement with the driving member 6 is provided by a further centrifugal element which must be moved inwardly against the centrifugal force acting thereon before such engagement can take place. As shown in Figure 4, such further centrifugal element takes the form of a weight 18 mounted so as to be capable of sliding radially in a slot 19 in the driving member 6. One end of said weight 18 is arranged to project into and contact with a cam-shaped slot 20 in the shoe 1, the cam being designed to move the weight inwardly when the shoe 1 is given a circumferential retardation upon its engagement with the driven member 11. The effect is the same as with the springs previously described. Obviously combinations of the means referred to could be utilized in carrying the invention into effect.

For certain purposes, for instance in the driving of generators supplying heating current, it may be desirable to make the clutch capable of being permanently disengaged when the drive is not required, in the instance given, say, during warm weather. To enable this to be done the clutch shoes 1 may each be provided with a projection 21 (Figures 5 and 6) which, when said shoes are unexpanded, can be engaged by a locking device mounted on a terminal flange 22 on the driving member 6. This device consists, as shown, of an abutment finger 23 mounted upon the flange 22 by means of a screw 24 projecting through an arcuate slot 25 in said flange. By moving the screw to one end of the slot, the abutment finger can be caused to engage over the projection 21 (Figure 5) thereby preventing centrifugal expansion of the shoe 1 and rendering the clutch inoperative. When at the other end of said slot 25, this abutment finger 23 is so located as to allow free expansion of the shoe 1. The screw 24 serves both as manipulating means and as locking means for securing the abutment finger 23 in the position to which it is set. The clutch shown in Figures 5 and 6 can embody any one of the arrangements shown in the preceding figures.

I claim:—

1. A centrifugal clutch comprising driving and driven parts, centrifugal clutch shoes operative for engaging the driven part at a predetermined speed, said shoes and driving part having cam formations adapted to co-act in wedging engagement when said shoes engage the driven part, means interposed between said driving part and the shoes adapted for retarding engagement between said cam formations, and adjustable locking devices on the driving part adapted to prevent engagement of the clutch shoes with the driven part to render the clutch inoperative.

2. A centrifugal clutch comprising driving and driven parts, centrifugal clutch shoes operative for engaging and gripping the driven part at a predetermined speed, said shoes and driving part having cam formations adapted to co-act when said shoes are retarded owing to gripping engagement with the driven part, stops on the driving part and the shoes, and compression springs housed in slots formed in said shoes and operative between said stops for retarding camming engagement between the shoes and driven part.

3. A reversible centrifugal clutch comprising a driving part having outwardly projecting cams, a driven part surrounding said driving parts, clutch shoes located between said driving and driven parts adapted to engage and grip said driven part at a predetermined speed, cam formations on the front and rear of said shoes adapted to come into wedging engagement with said cams on the driving part when the shoes are retarded by engagement with the driven part, stops on the driving member and on said shoes, rods fixed on the driving member and received in a circumferential slot formed in said shoes, and compression springs coiled round said rods and operative between said stops for retarding engagement between said cams and cam formations.

4. A centrifugal clutch comprising a driving part formed with guiding slots and external cams, a driven part surrounding said driving part, centrifugal clutch shoes between said parts and formed with cam formation adapted to co-act with said cams on the driving part when the shoes grip the driven part, and yielding resistance means guidingly movable in said slots and operative against said shoes for resisting the initiation of wedging action between said cams.

5. A centrifugal clutch comprising a driving part formed with guiding slots and external cams, a driven part surrounding said driving part, centrifugal clutch shoes between said parts and formed with cam formations adapted to co-act with said cams on the driving part when the shoes grip the driven part, and auxiliary centrifugal elements movable in said slots in the driving part and operative against said shoes for resisting the initiation of wedging action between said cams.

6. Centrifugal clutch comprising driven and driving parts, centrifugal clutch shoes operative for engaging the driven part at a predetermined speed, cam formations on the driving part and co-operative cam formations on the shoes disposed circumferentially in advance of the cam formations on the driving part, said cam formations on the driving part and shoes co-acting in wedging engagement when said shoes are retarded on gripping the driven part, and yielding resistance means interposed between said shoes and driving part and operative for resisting the initiation of wedging action between said cam formations.

7. Centrifugal clutch comprising driven and driving parts, centrifugal clutch shoes operative for engaging the driven part at a predetermined speed, cam formations on the driving part and co-operative cam formations on the shoes disposed circumferentially in advance of the cam formations on the driving part, said cam formations on the driving part and shoes co-acting in wedging engagement when said shoes are retarded on gripping the driven part, and compression springs interposed between said driving part and said shoes adapted for resisting the initiation of wedging action between said cam formations.

8. A reversible centrifugal clutch comprising a driving part having external cams, a driven part surrounding said driving part, centrifugal clutch shoes between said parts and formed with front and rear cam surfaces adapted to co-act with said cams on the driving part when the shoes grip the driven part, and means interposed between said shoes and driving part and operative for resisting the initiation of wedging action between said cams.

ERNEST CHARLES HATCHER.